JACK W. MEYER
IREL H. MEYER
INVENTORS

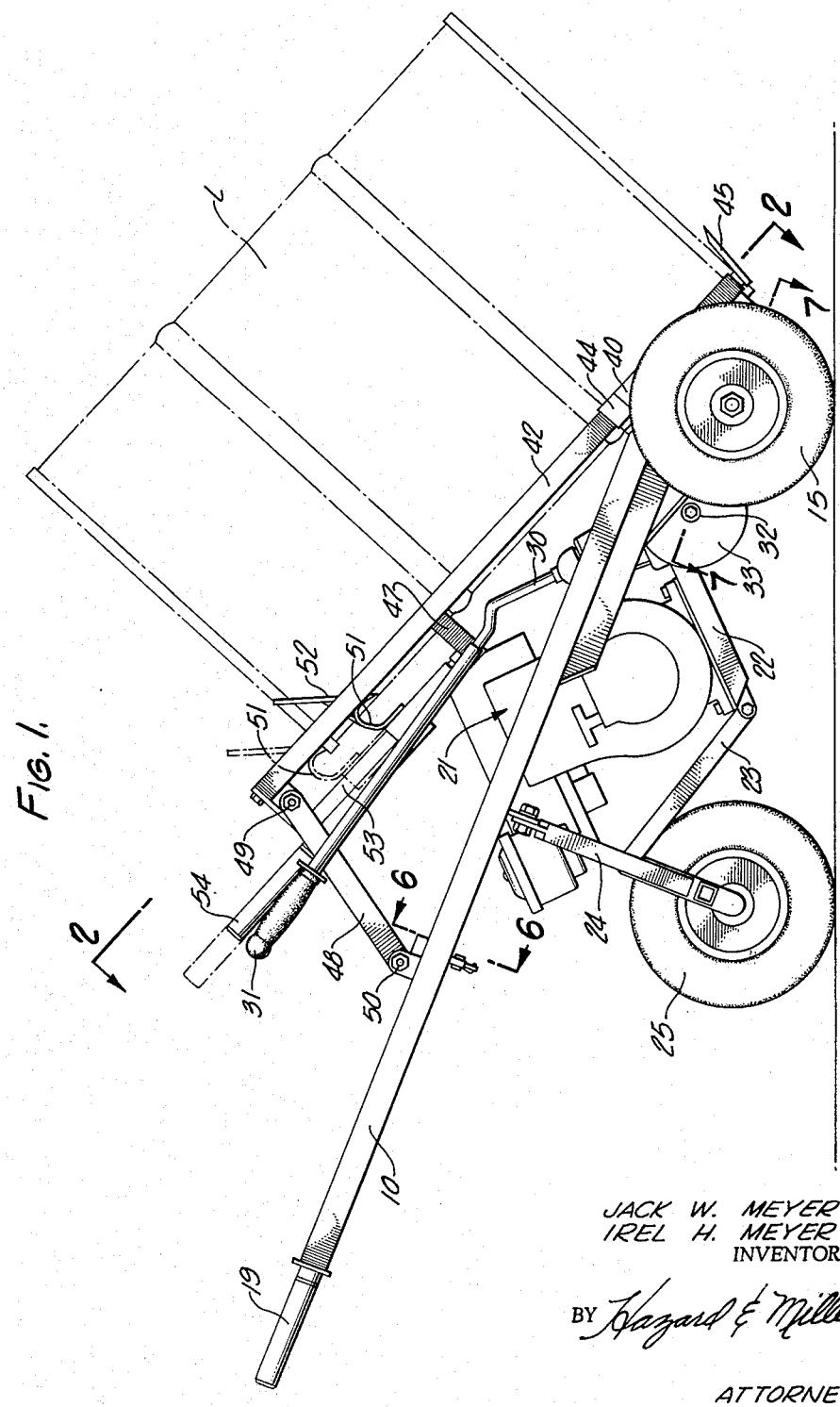

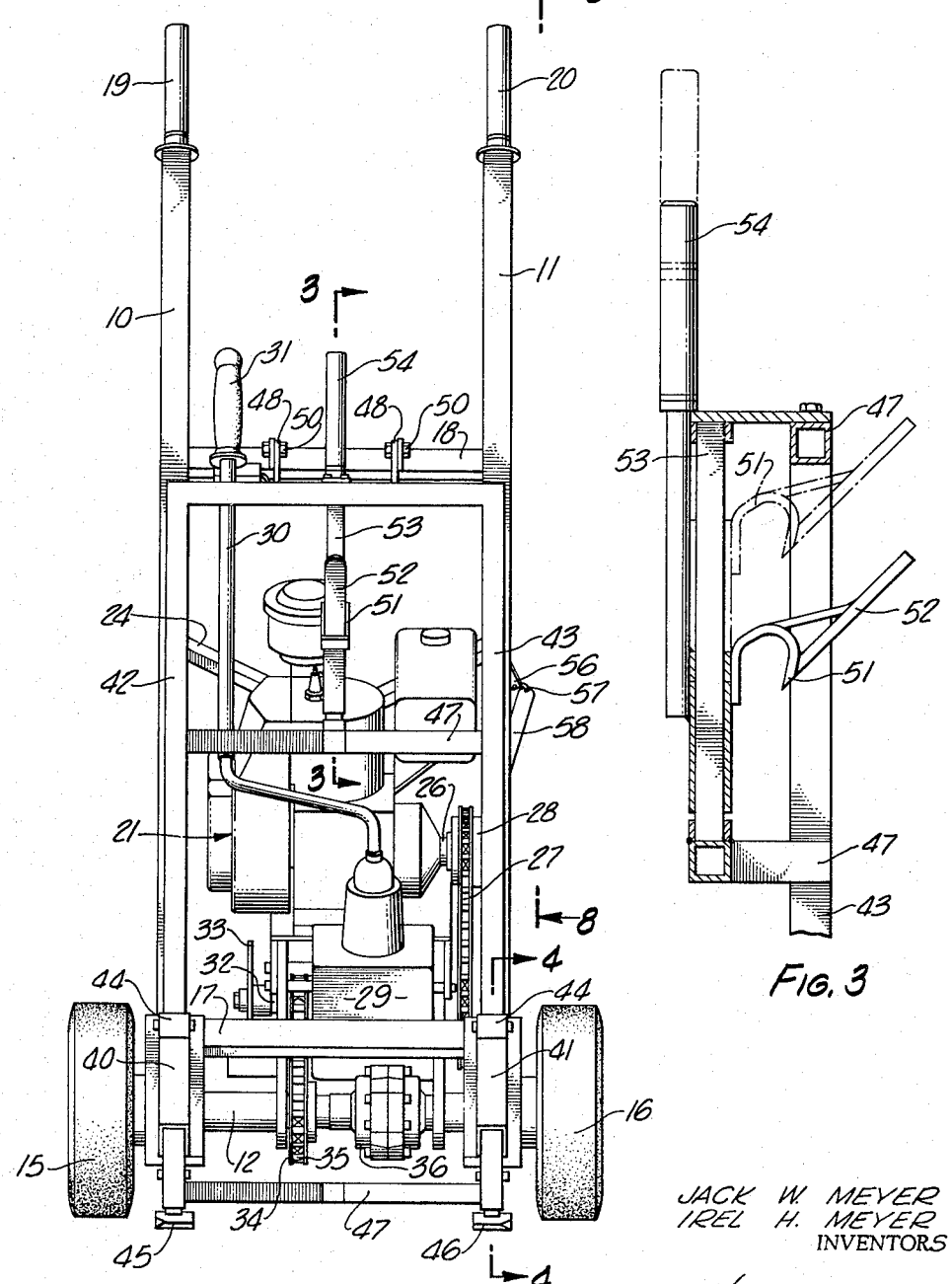

BY *Hazard & Miller*

ATTORNEYS

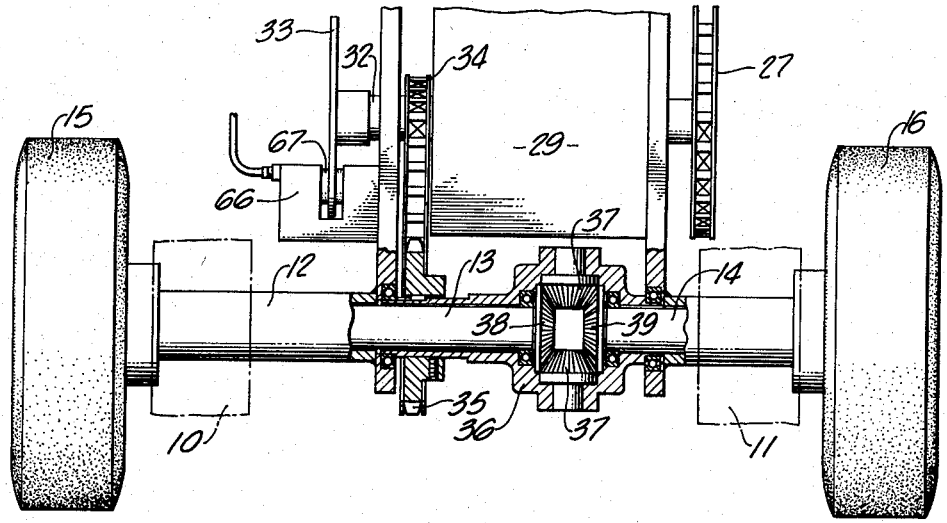
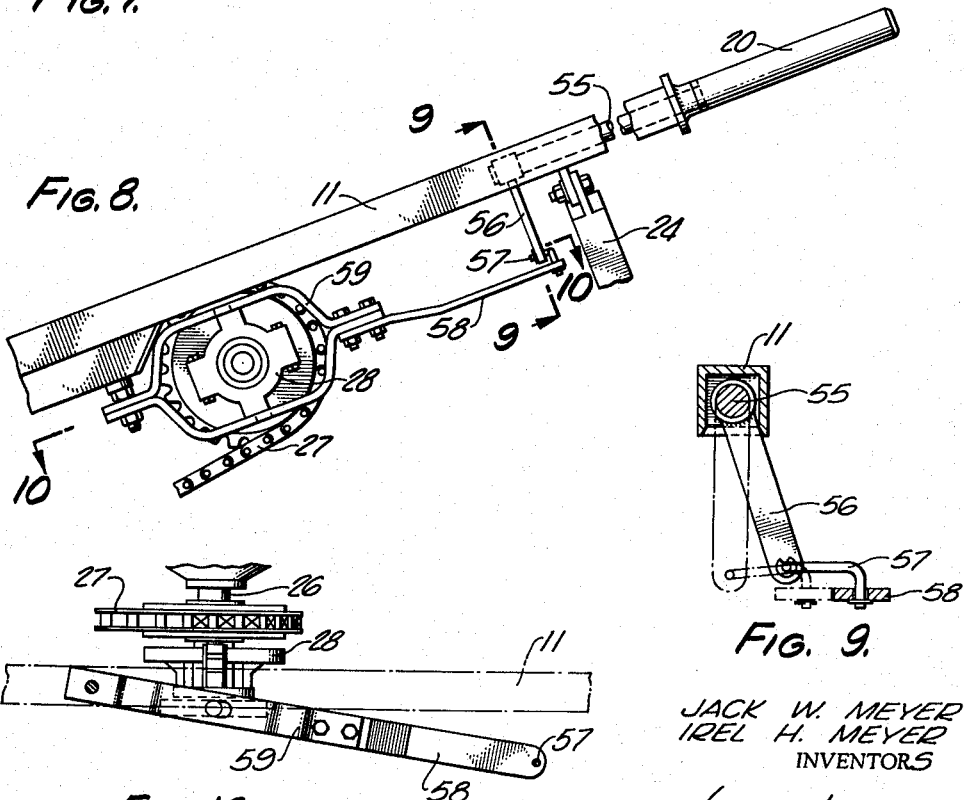
JACK W. MEYER
IREL H. MEYER
INVENTORS 3,182,835
POWERED BARREL TRUCK
Jack W. Meyer and Irel H. Meyer, both of
3550 Cajon Blvd., San Bernardino, Calif.
Filed May 13, 1963, Ser. No. 279,850
2 Claims. (Cl. 214—383)

This invention relates to improvements in hand trucks such as are employed to enable the picking up of relatively heavy objects such as loaded barrels or casks, transporting them from one locality to another and depositing them at the new location.

A primary object of the present invention is to provide a motor-driven or powered hand truck which has ground wheels that are driven by a source of power carried by the hand truck; to provide a drive including a differential between the ground wheels so that although power driven, the hand truck can be readily caused to move over curved paths; to provide a speed-change transmission and a clutch operable by one rotatable handle on the hand truck to cause the clutch to engage and disengage, and to provide a brake operable by another rotatable handle to engage and release, whereby the hand truck can be stopped at will.

Still another object of the invention is to provide a truck having the above-mentioned characteristics wherein there speed-change transmission is operable by a lever so located as not to be interfered with by the load when the truck is loaded.

Another object of the invention is to provide a truck having the above-mentioned characteristics wherein there is a body frame that carries the motor or power source supported at one end by ground wheels driven thereby, and which has a loading frame slidably mounted on the body frame for sliding movement within limits, the loading frame having feet that can be forced by the ground wheels beneath the load. As the loading frame is slidable relative to the body frame, this facilitates the positioning of the feet on the surface that supports the load to assure that the feet can be driven beneath the load prior to lifting it. The body frame also includes a latch engageable with the top of the load for retaining the load on the loading frame. This latch is equipped with a cam so that when the loading frame is applied to the load the latch is automatically cammed into a position wherein it may engage the load by gravity. A handle is provided for releasing the latch which is so located as not to be interfered with by the load on the loading frame.

With the foregoing and other objects in view, which will be made manifest in the following detailed description and specifically pointed out in the appended claims, reference is had to the accompanying drawings for an illustrative embodiment of the invention, wherein:

FIGURE 1 is a view in side elevation of the truck embodying the present invention, the truck being shown as having been loaded with a load that is to be transported by the truck;

FIG. 2 is a view taken substantially upon the line 2—2 upon FIG. 1 in the direction indicated;

FIG. 3 is a partial view taken substantially upon the line 3—3 upon FIG. 2 in the direction indicated;

FIG. 7 is a partial view taken substantially upon the line 7—7 upon FIG. 1 in the direction indicated;

FIG. 8 is a partial view taken substantially upon t line 8—8 upon FIG. 2 in the direction indicated;

FIG. 9 is a partial view in section taken on the line 9– upon FIG. 8 in the direction indicated; and FIG. 10 is a partial view taken substantially upon t line 10—10 upon FIG. 8 in the direction indicated.

Figure 6:
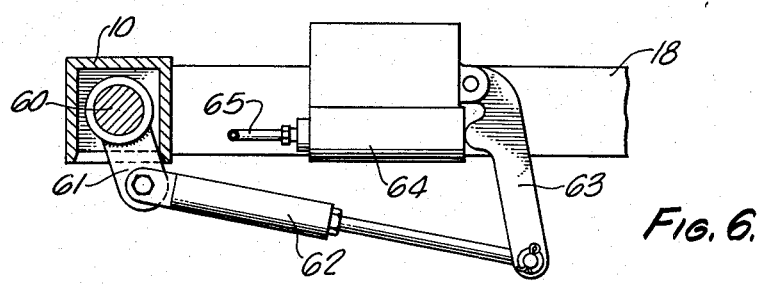
FIG. 6 is a partial view taken substantially upon the line 6—6 upon FIG. 1 in the direction indicated.
Figure 4:
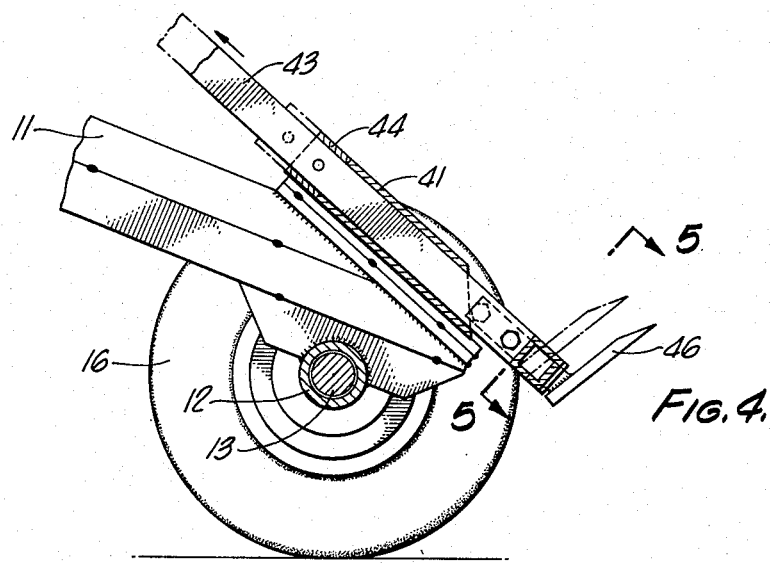
FIG. 4 is a partial view taken substantially upon the line 4—4 upon FIG. 2 in the direction indicated.
Figure 5:
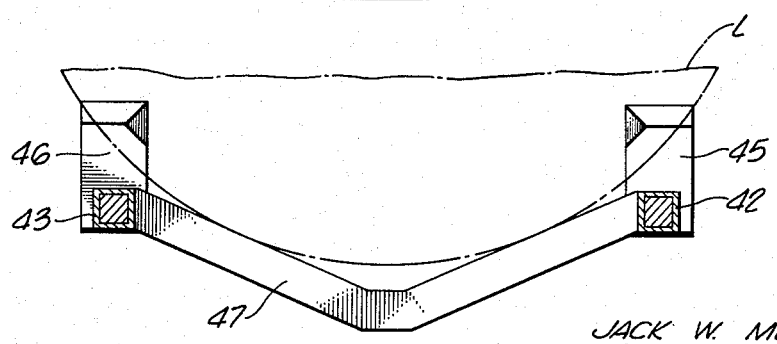
FIG. 5 is a partial view taken substantially upon the line 5—5 upon FIG. 4 in the direction indicated.

Referring to the accompanying drawings wherein sii lar reference characters designate similar parts throuş out, the truck embodying the invention comprises a bc frame consisting of a pair of substantially parallel me bers 10 and 11 connected at their forward ends by axle housing 12 through which axles 13 and 14 exter axle housing 12 through which axles 13 and 14 exter The outer ends of the axle housing serve to rotatal support ground wheels 15 and 16 so that these grou wheels can be driven either forwardly or rearwardly the axles 13 and 14. The rear ends of the members and 11 of the body frame may be connected such as cross connections 17 and 18 and at their extreme re ends they have handles 19 and 20 rotatably moun thereon. These handles may be used to swing the bc frame laterally to either side in steering or directing direction in which the ground wheels 15 and 16 pro the truck.

A source of power, such as an internal combustion gine generally indicated at 21 is rigidly mounted on body frame and may be supported thereon such as supports 22 that extend downwardly and rearward These supports may be connected such as by links 23 supports 24 between which a third ground wheel 25 rotatably mounted. The ground wheel 25 may be used cooperate with the ground wheels 15 and 16 to supp the body frame in an inclined position as shown in F] 1 either when loaded or unloaded. Normally, howev when the truck is loaded and is transporting the load fr one location to another the body frame is swung upwar and forwardly from the position shown in FIG. 1 so t the load L is largely balanced on only the forward grot wheels 15 and 16.

The internal combustion engine 21 is preferably a g oline engine equipped with a governor that controls throttle of the engine so as to maintain the engine op ating at substantially constant speed even though th may be some variations in the load imposed. Such engine is not essential to the truck but is preferably e ployed because of its self-throttling characteristics.

A power output from the engine is indicated at which drives an endless chain 27 when the clutch 28, FIGS. 8 and 10, is engaged. The endless chain 27 dri the input shaft of a speed-change transmission 29 tha controllable by a shifting lever 30 having a handle The speed-change transmission preferably has three 1 ward speeds, each of which can be selected by lever and a reverse gear which is also selectable by lever The output shaft from the speed-change transmission is indicated at 32 and carries the disc 33 of a disc bra It also carries a sprocket over which is trained an end chain 34 that drives a sprocket 35 that is keyed or otl wise connected to the housing 36 of a differential. T differential includes spider gears 37 rotatably mounted the housing which mesh with miter gears 38 and 39 t are rigid with the axles 13 and 14, respectively. Tl when the speed-change transmission 29 is in gear motor or engine 21 is running and the clutch 28 is gaged, power is transmitted through the speed-cha transmission to the differential and from the differen is transmitted to the ground wheels 15 and 16 to ca these ground wheels to be forcibly propelled. The dif ential performs its usual function, permitting one gror wheel 15 or 16 to rotate faster or slower than the ot ould be occasioned in following curved paths without lving skidding or slipping.

n the forward end of the body frame there are rigidly nted guides 40 and 41 through which the side rails nd 43 of a load frame are slidable. These side rails / collars or equivalent stops 44 which are engageable the tops of the guides to limit downward movement 1e rails of the loading frame relative to the body e. The extreme lower ends of the rails 42 and 43 forwardly beveled feet 45 and 46 that are rigid with. These feet when the body frame is swung uplly and forwardly into a position to cause the load e to be substantially vertical, will rest on the suping surface on which the load L may be resting due e ability of the rails 42 and 43 to slide downwardly in the guides 40 and 41 until such surface is engaged. n the feet are in engagement with the surface and the nd wheels 15 and 16 are propelled forwardly the feet orced beneath the load L, the bevels in effect funcng as cams to cam the load upwardly off of the sura sufficient distance to permit of the entry of the therebeneath.

ie side rails 42 and 43 are connected to each other ly by transverse members 47. These transverse bers frequently are bowed rearwardly so as to par- r accommodate or receive a cylindrical object such barrel or cask. The rear end of the body frame has 48 pivotally connected thereto as at 50 and the links ilso pivotally connected to the load frame as at 49.

though the guides 40 and 41 largely restrict the rails nd 43 of the load frame to linear movement, this ement is not of any great magnitude. Consequently, ugh the pivots 49 swing through arcs as the load e rises and falls relative to the body frame, the arcs ikewise small and any looseness either in the pivots tween the load frame and the guides 40 and 41 perof this movement without binding.

latch 51 is provided which is in the nature of an ted hook equipped with a slanting or cam surface This hook is slidably mounted on a guide 53 that is with the load frame. It is capable of being moved itudinally with respect to the load frame by means handle 54 which is located between the rear end of oad frame and the body frame. In this position the le is accessible at all times by the person operating ruck and is not in any way interfered with by the nce of the load L on the body frame. When the frame is in approximately vertical position and its 45 and 46 are being forced beneath the bottom of load L the cam surface 52 simultaneously engages op edge of the load and cams the hook-shaped latch rdly such as from the full-line position shown in 1 to the dotted-line position. When the latch has cammed upwardly a sufficient distance the hooked latch may pass over the top edge of the load L descend by gravity to engage any rim that may be nt on the load L to retain the load in position against oad frame. After the latch has been engaged the frame can be swung downwardly and rearwardly to he load L from the supporting surface and approxily balance it on the ground wheels 15 and 16 and in position the ground wheels may be propelled to transthe load L from place to place.

will be observed that the handle 31 on the lever of peed-change transmission 29 is also located between oad frame and the body frame reasonably close to andle 54 so that the presence of the load L likewise not interfere with manipulation of the lever 30.

andle 20 is rotatably mounted on the side rail 11 of ody frame, and is rigid with a shaft 55 that is rotatmounted therein. This shaft carries a crank 56 that nnected as at 57 to the arm 58 of a yoke 59 that is ected to the clutch 28. The clutch 28 is preferably e friction-plate type so that by rotation of the handle 1 one direction the clutch may be engaged and conversely rotation of the handle in the opposite direction will cause the clutch 28 to disengage. When the clutch is disengaged the drive between the engine 21 and the ground wheels 15 and 16 is discontinued.

In a similar manner the handle 19 is rotatably mounted on the side 10 of the body frame and is rigid with a rotary shaft 60 having a crank 61, see FIG. 6. This crank is connected by an adjustable link 62 to a pivot lever 63 that operates the piston of a master cylinder 64. The master cylinder is connected by tubing 65 to a slave cylinder 66 having brake shoes 67 engageable wtih opposite sides of the disc 33. When the handle 19 is rotated in one direction fluid under pressure is expelled from the master cylinder to the slave cylinder 66 to cause the brake shoes 67 to engage the disc 33 and retard or arrest rotation of the output from the speed-change transmission. The braking effort is transmitted through the endless chain 34 to the differential and transmitted therefrom through the axles to the ground wheels 15 and 16. Reverse rotation of the handle 19 releases the pressure generated in the master cylinder and causes the brakes to be released.

From the above-described construction it will be appreciated that it is possible to approach a load such as a barrel or cask resting upright on a supporting floor or surface to propel the feet 45 and 46 therebeneath and to automatically latch the load on the load frame. Thereafter, by tilting the body frame and load frame rearwardly the load will be lifted onto the load frame and can be substantially balanced on the ground wheels 15 and 16. The ground wheels can be forcibly driven to transport the load. If the terrain over which the load is being transported permits of driving the ground wheels at high speed the clutch 28 may be disengaged and re-engaged in the course of shifting the speed-change transmission into high speeds. On the other hand, if it is necessary to transport the load up a relatively steep incline such as a ramp leading into a truck, the speed-change transmission may be shifted into one of the lower gears. If the load is being transported down a ramp rotation of the ground wheels 15 and 16 may be effectively retarded by the application of the brake shoes 67.

As will be appreciated by those skilled in the art the truck is quite versatile in its application and uses.

Various changes may be made in the details of construction without departing from the spirit and scope of the invention as defined by the appended claims.

We claim:

1. In a hand truck, a body frame supported at one end on ground wheels and having handles at the other end thereof, said body frame providing guides adjacent the ground wheels, a loading frame slidable between limits in the guides, said loading frame having loading feet on the forward end thereof, links pivotally connected to the rear end of the loading frame and to the body frame, and latch means slidably mounted between limits on the loading frame engageable with the upper end of a load supported on the loading feet, said latch means having a cam associated therewith for opening the latch means with respect to the loading feet, and a handle connected to the latch means, said handle being located between the frames.

2. In a hand truck, an elongated body frame supported at one end on ground wheels and having handles at the other end thereof, an elongated loading frame arranged at an angle to the length of the body frame, guides on the mentioned end of the body frame in which the loading frame is slidable, means limiting the sliding movement of the loading frame relative to the guides, said loading frame having loading feet on the forward end thereof, and rigid lengths pivotally connecting the rear end of the loading frame to the body frame.

(References on following page)

References Cited by the Examiner

UNITED STATES PATENTS

| | | | |
|---|---|---|---|
| 530,577 | 12/94 | Bowser | 214—654 |
| 2,504,885 | 4/50 | Schreck | 187—9 |
| 2,663,440 | 12/53 | Jackson | 280—47.29 X |
| 2,881,865 | 4/59 | Lewis | 187—10 |
| 2,981,374 | 4/61 | Holsclaw | 187—10 |
| 3,003,586 | 10/61 | Loef et al. | 187- |
| 3,124,263 | 3/64 | Eaves | 214—( |

FOREIGN PATENTS 340,766   10/59   Switzerland.

HUGO O. SCHULZ, *Primary Examiner.*

GERALD M. FORLENZA, *Examiner.*